US012650668B2

(12) United States Patent
Di Domenico et al.

(10) Patent No.: US 12,650,668 B2
(45) Date of Patent: Jun. 9, 2026

(54) HOROLOGICAL REGULATING MEMBER WITH BALANCE SPRING PROVIDED WITH PRESSURE-COMPENSATING MEANS

(71) Applicant: The Swatch Group Research and Development Ltd, Marin (CH)

(72) Inventors: Gianni Di Domenico, Neuchâtel (CH); Baptiste Hinaux, Lausanne (CH); Mohammad Hussein Kahrobaiyan, Boudevilliers (CH); Jean-Luc Helfer, Le Landeron (CH); Pascal Winkler, St-Blaise (CH)

(73) Assignee: The Swatch Group Research and Development Ltd, Marin (CH)

( * ) Notice: Subject to any disclaimer, the term of this patent is extended or adjusted under 35 U.S.C. 154(b) by 317 days.

(21) Appl. No.: 18/450,028

(22) Filed: Aug. 15, 2023

(65) Prior Publication Data

US 2024/0061377 A1 Feb. 22, 2024

(30) Foreign Application Priority Data

Aug. 19, 2022 (EP) .................................... 22191188

(51) Int. Cl.
*G04B 17/06* (2006.01)
*G04B 17/04* (2006.01)

(52) U.S. Cl.
CPC ......... *G04B 17/063* (2013.01); *G04B 17/045* (2013.01)

(58) Field of Classification Search
CPC .... G04B 17/063; G04B 17/045; G04B 17/24; G04B 17/066; G04B 17/22; G04B 17/222
See application file for complete search history.

(56) References Cited

U.S. PATENT DOCUMENTS 9,535,404 B2 * 1/2017 Bas ........................ G04B 17/20
2017/0059315 A1 * 3/2017 Ferri .......................... G01L 7/14
2022/0171336 A1 * 6/2022 Kahrobaiyan ......... G04B 18/06

FOREIGN PATENT DOCUMENTS

EP 4 009 115 A1 6/2022
FR 410898 A 6/1910
WO WO-2013079810 A1 * 6/2013 ........... G04B 47/066

OTHER PUBLICATIONS

European Search Report issued Jan. 18, 2023 in European Application 22191188.6 filed on Aug. 19, 2022 (with English Translation of Categories of cited documents), 3 pages.

* cited by examiner

*Primary Examiner* — Regis J Betsch
*Assistant Examiner* — Kevin Andrew Johnston
(74) *Attorney, Agent, or Firm* — Oblon, McClelland, Maier & Neustadt, L.L.P.

(57) ABSTRACT

A regulating member for a horological movement includes an oscillating weight, for example a balance, a balance spring including a flexible strip wound about itself in a plurality of turns, the strip having a predefined rigidity to allow the oscillating weight to undergo a rotary oscillatory motion, and the strip including an outer end of the strip. The regulating member includes a resilient device for compensating for external pressure, connecting the outer end to a first support that is immobile with respect to the horological movement, the resilient compensation device being configured to adapt its stiffness according to the external pressure in order to compensate for an effect of the external pressure on the regulating member. Additionally, the horological movement includes the regulating member.

19 Claims, 1 Drawing Sheet

HOROLOGICAL REGULATING MEMBER WITH BALANCE SPRING PROVIDED WITH PRESSURE-COMPENSATING MEANS

CROSS REFERENCE TO RELATED APPLICATIONS

This application claims priority to European Patent Convention Application No. 22191188.6, filed Aug. 19, 2022. The entire disclosures of the above application are incorporated herein by reference.

TECHNICAL FIELD OF THE INVENTION

The invention relates to a regulating member having a balance spring and provided with pressure-compensating means. The invention further relates to a horological movement comprising such a regulating member.

TECHNOLOGICAL BACKGROUND

Most mechanical watches today are equipped with a balance spring and a Swiss lever escapement mechanism. The balance spring constitutes the time base of the watch. It is also referred to as a resonator or regulating member.

As for the escapement, this fulfils two main functions:

to maintain the to-and-fro motions of the resonator;

to count these to-and-fro motions.

An inertial element, a guide and an elastic return element are required in order to constitute a regulating member. Conventionally, a balance spring acts as a resilient return element for the inertial element constituted by a balance. This balance is guided rotationally by pivots, which generally turn in ruby plain bearings.

A frequency is chosen for the mechanical resonator, and is determined in order to obtain a predefined rate for the horological movement.

However, during operation, such a mechanical resonator can be subject to interference caused by changes in external parameters, which lead to variations in the frequency of the resonator. These parameters are, for example, the temperature, pressure, humidity or gravity. The variation in the frequency of the resonator results in an error in the measurement of time and thus in the rate of the horological movement.

For example, the document CH 704687 describes a regulating member comprising a balance spring and a member for correcting the position of the balance-spring stud to correct the deformations of the balance spring due to temperature.

At the present time, there does not exist any regulating member provided with compensation means configured to compensate for variations in ambient pressure. Thus, when the pressure changes, for example because of the altitude, the regulating member loses in precision, since the difference in pressure modifies the aerodynamic friction of the regulating member. For example, an increase in pressure causes a decrease in the oscillation frequency of the regulating member.

SUMMARY OF THE INVENTION

The purpose of the present invention is to overcome some or all of the aforementioned drawbacks by providing a horological regulating member having a balance spring provided with pressure-compensating means that are precise and adapted to a balance spring.

To this end, the invention relates to a regulating member for a horological movement comprising an oscillating mass, for example a balance, a balance spring comprising a flexible strip coiled on itself in several turns, the strip having a predefined rigidity to enable the oscillating mass to perform a rotary oscillatory movement, the strip comprising an outer end.

The invention is remarkable in that the regulating member comprises an elastic device for compensating for the external pressure, connecting the external end of the strip to a first support that is immobile with respect to the horological movement, the elastic compensation device being configured to adapt its stiffness according to the external pressure in order to compensate for the effect of external pressure on the regulating member.

By virtue of the invention, the prestressing means exert a variable force or torque on the elastic element of the elastic compensation device according to the pressure, so that the regulating member substantially keeps precise running despite significant changes to the pressure. This is because, when the pressure changes, the prestressing means modify the force or torque exerted on the resilient element so as to modify the stiffness of the assembly comprising the resilient element and the balance spring. By modifying the stiffness of this assembly, the rate of the regulating member is adjusted. As a result, when the pressure changes, the resilient device is mechanically impacted to adjust the rate of the balance spring to this change.

This resilient element modifies the rigidity of the attachment point and provides the resonator with additional flexibility. Thus, the effective rigidity of the resonator includes the rigidity of the strip and the rigidity of the resilient element. The variable force or torque allows the resilient element to be prestressed, preferably without prestressing the strip and without displacing the end of the strip. By prestressing the resilient element, the rigidity thereof changes, whereas the rigidity of the strip remains unchanged since it is not prestressed and since the end thereof is not displaced.

By changing the flexibility of the resilient element, the rigidity of the resonator (rigidity of the strip and rigidity of the resilient element) changes, which thus modifies the rate of the resonator. The resilient element being preferably more rigid than the strip, the contribution of the flexibility of the resilient element in the rigidity of the whole is lower than that of the strip. As a result, a modification in the rigidity of the resilient element modifies the rigidity of the whole resonator, and thus finely regulates the rate thereof, allowing the frequency of our time base to be precisely adjusted. Great precision in the maintenance of running according to pressure is thus obtained.

According to a particular embodiment of the invention, the elastic compensation device comprises an elastic element arranged between the external end of the strip and the immobile support, as well as prestressing means for applying a variable force or torque to the elastic element according to the external pressure.

According to one specific embodiment of the invention, the prestressing means comprise a spring part connected to the resilient element, the spring part transmitting the force or torque to the resilient element.

According to a particular embodiment of the invention, the prestressing means comprise an aneroid capsule the volume of which varies according to the external pressure, so as to transmit a variable force or torque according to the external pressure.

According to a particular embodiment of the invention, the aneroid capsule comprises a movable wall and a non-movable wall connected by at least one spring.

According to one specific embodiment of the invention, the spring part comprises a first flexible blade connected to the resilient element.

According to one specific embodiment of the invention, the spring part comprises a translation stage connected to the first flexible blade, the aneroid capsule being in contact with the translation stage.

According to a particular embodiment of the invention, the resilient part comprises a first movable element connected to the first flexible blade, and a second movable element, the first movable element and the second movable element being connected by a pair of parallel flexible blades.

According to one specific embodiment of the invention, the spring part comprises a second flexible blade connected to the aneroid capsule.

According to one specific embodiment of the invention, the resilient element comprises a suspended point-shaped body and a pair of non-crossing blades connecting the suspended point-shaped body to the first stationary support.

According to one specific embodiment of the invention, the prestressing means are connected to the suspended point-shaped body to exert the force or torque on the suspended point-shaped body.

According to a particular embodiment of the invention, the regulating member comprises means for regulating the prestressing means to apply a variable force on the prestressing means, for example on the first elongate movable element.

According to a particular embodiment of the invention, the regulating member extends substantially in the same plane, except for the oscillating mass.

The invention also relates to a horological movement including such a regulating member.

BRIEF DESCRIPTION OF THE FIGURES

The aims, advantages and features of the present invention will appear upon reading several embodiments given only as non-limiting examples, with reference to the appended drawings wherein.

DETAILED DESCRIPTION OF THE INVENTION

Figure 1:
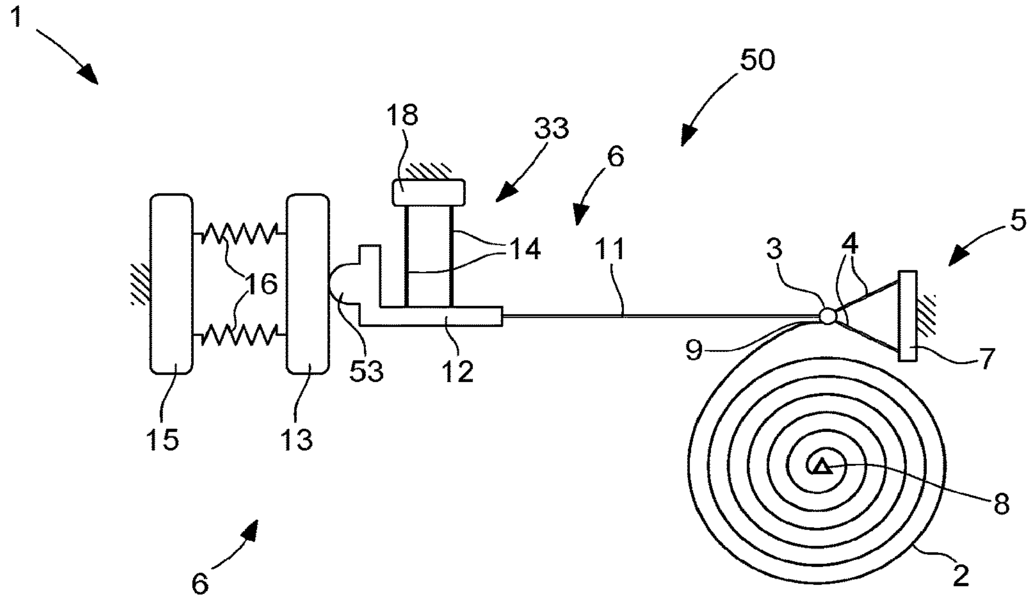
FIG. 1 schematically shows a cross-section plan view of a first embodiment of a regulating member provided with means for compensating for the pressure, and FIG. 2 schematically shows a cross-section plan view of a second embodiment of a regulating member provided with means for compensating for the pressure.
Figure 2:
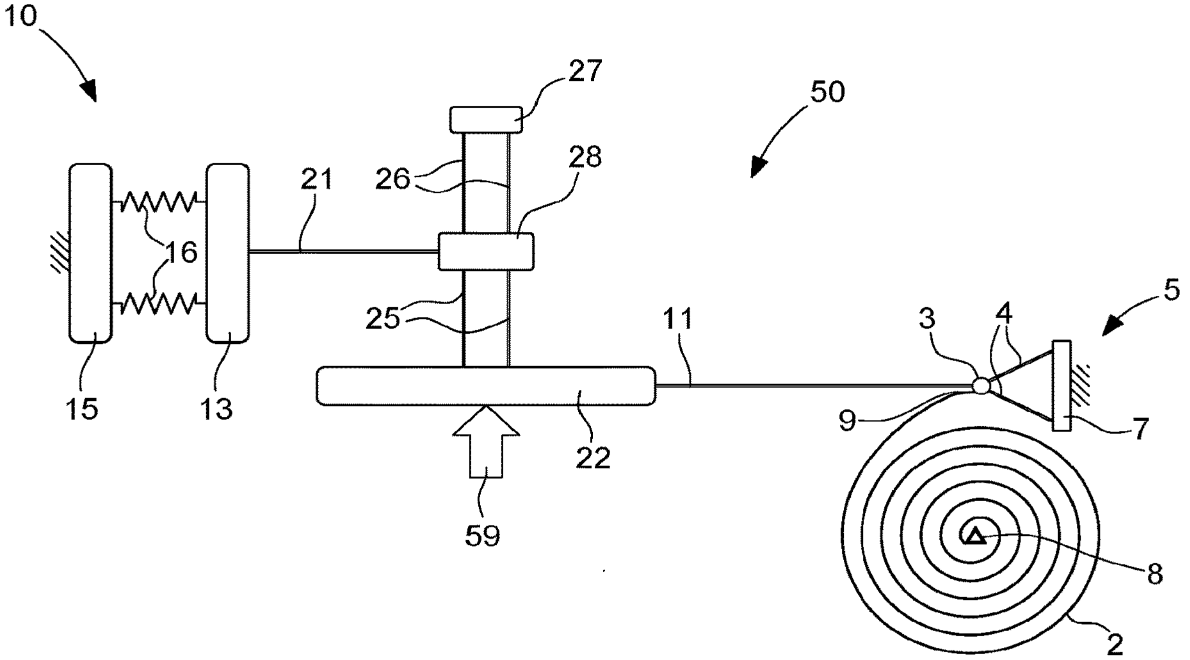

FIGS. 1 and 2 each show an embodiment of a regulating member 1, 10 according to the invention, the regulating member 1, 10 comprising a resilient device 50 configured for compensating for a variation in pressure exerted on the regulating member 1, 10. Such regulating members 1, 10 are intended to be arranged in a horological movement to regulate it.

In both embodiments, the regulating member 1, 10 comprises a balance spring provided with a flexible strip 2 wound about itself in a plurality of turns. The flexible strip 2 comprises an outer end 9 and an inner end 8.

The regulating member 1, 10 comprises an oscillating weight, for example an annular balance, not shown in the figures, which is connected to the inner end 8 of the strip 2, the strip 2 having a predefined rigidity to enable the oscillating weight to undergo a rotary oscillatory motion. For example, the oscillating weight comprises an axial rotating shaft, the inner end 8 of the strip 2 being connected to said shaft.

Preferably, the regulating member 1, 10 extends substantially in the same plane, except for the oscillating weight, which oscillates in a parallel plane above the balance spring.

According to the invention, the regulating member 1, 10 comprises a resilient device 50 for compensating for an external parameter, which device is configured to adapt the stiffness of the resilient element 5 as a function of the pressure so as to compensate for the effect of pressure on the regulating member 1, 10.

The elastic compensation member 50 is configured to adapt its stiffness according to the variations in the surrounding pressure in order to compensate for the effect of these variations on the balance spring. The elastic compensation device 50 preferably has a stiffness greater than the strip 2.

The resilient device 50 comprises a resilient element 5 connecting the outer end 9 of the strip 2 to a support 7 that is stationary relative to the horological movement, for example to a fixed plate. The resilient device 50 further comprises prestressing means 6 for applying a variable force or torque to the resilient element 5 as a function of the external parameter.

The resilient element 5 comprises, in this case, a suspended point-shaped body 3 and a pair of non-crossing blades 4 connecting the suspended point-shaped body 3 to the stationary support 7. The suspended point-shaped body 3 is, for example, a cylindrical body with a height substantially equal to the diameter, with the non-crossing blades 4 extending from the suspended point-shaped body 3 as far as the stationary support 7.

The resilient element 5 is arranged in the continuation of the flexible strip 2, the balance spring and the resilient element 5 being adjacent, but while avoiding contact during the oscillation of the oscillating weight.

The prestressing means 6 are configured to exert the force or torque on the suspended point-shaped body 3. Thus the stiffness of the elastic device is modified since the prestressing means 6 modify the stiffness of the non-crossed blades 4.

The prestressing means 6 comprise a spring part provided with a single flexible blade 11 connected to the suspended point-shaped body 3. The single flexible blade 11 extends in the axis of the resilient element, tangentially to the balance spring, and is slightly offset with respect to the outer end 9.

The spring part is furthermore configured to undergo a variable force or torque that is transmitted to the elastic element 5.

In the first embodiment shown in FIG. 1, the spring part of the prestressing means 6 comprises a translation stage 33 provided with a first L-shaped movable element 12 and a second support 18 that is stationary relative to the movement. The first movable element 12 is connected to the single flexible blade 11 by one end of a first arm of the L shape. The second arm of the L shape includes a rounded protrusion 53 on the outer side. The translation stage 33 comprises two substantially parallel flexible blades 14 connecting the first movable element 12 to the second stationary support 18.

To transmit a variable force or torque according to the external pressure to the spring part, the prestressing means 6 comprise an aneroid capsule.

Such a capsule is generally used for measuring atmospheric pressure. For this purpose, the capsule comprises a space at least partly void of air, and comprises a resilient return element of the spring type in the space to hold a movable wall of the capsule. Thus, when the external pressure increases, the capsule is compressed, and when the external pressure decreases, the capsule is enlarged.

On FIG. 1, the aneroid capsule comprises a volume that is variable according to the external pressure.

For this purpose, the aneroid capsule comprises a movable wall 13 and a non-movable wall 15. An airtight chamber, not shown on the figures, makes it possible to at least partly create the vacuum inside the movable 13 and non-movable 15 walls.

The non-movable wall 15 is non-movable with respect to the movement, and is for example secured to a plate or to a fixed plate bridge. The non-movable wall 15 here has a diagrammatical parallelepiped shape.

The movable wall 13 also has a diagrammatical parallelepiped shape, the movable wall 13 being arranged facing the non-movable wall 15.

The aneroid capsule furthermore comprises a spring 16 connecting the movable 13 and non-movable walls 15, which form the elastic return element of the aneroid capsule. The spring 16 is disposed between the movable 13 and non-movable 15 walls.

According to the pressure exerted on the movable wall 13, the spring 16 extends, in particular when the pressure drops, or contracts, in particular when the pressure increases. Thus it moves the movable wall 13 closer to or further away from the non-movable wall 15.

The spring part of the prestressing means 6 is connected to the aneroid capsule, the spring part transmitting the force or torque from the aneroid capsule to the point-shaped body 3 of the resilient element 5.

The function of the translation stage 33 is to transform the separation distance of the capsule into a stressing force for the point-shaped body 3.

When the pressure changes, the movable wall 13 moves closer to or further away from the non-movable wall 15. Thus the movable element 12 of the translation stage 33 is subject to a greater or lesser thrust force towards the resilient element 5, this force being transmitted to the point-shaped body 3 via the single flexible blade 11.

The prestressing means 6 exert a variable thrust force on the resilient element 5. Consequently the stiffness of the resilient element 5 varies, and makes it possible to adapt the running of the balance to the external pressure conditions to keep the precision of the regulating member.

For example, when the pressure increases, the movable wall 13 moves closer to the non-movable wall 15. This moving closer gives rise to a reduction in the thrust force on the point-shaped body 3, which is exerted by the prestressing means 6. Thus, the stiffness of the resilient element 5 is increased.

On the other hand, when the pressure decreases, the movable wall 13 moves further away from the non-movable wall 15. This moving away gives rise to an increase in the thrust force on the point-shaped body 3, which is exerted by the prestressing means 6. Thus, the stiffness of the resilient element 5 is reduced.

In the second embodiment, the regulating member 10 comprises a balance spring, an oscillating weight (not shown in the figure), a resilient element 5, and a first flexible blade 11 that is identical to the first embodiment.

In order to exert the force or torque on the resilient element 5, the spring part of the preloading means 6 comprises a first elongate movable element 22, connected to the flexible blade 11 and disposed in the continuation thereof.

The spring part comprises a first pair of parallel flexible blades 25 arranged on the same side, and connects the first movable element 22 to a second movable element 28.

The second movable element 28 is laterally connected to an aneroid capsule 15 by a second flexible blade 21 substantially parallel to the first movable element 22 when the regulating member 10 is in the rest position.

A second pair of parallel flexible blades 26 connects the second movable element 28 to a third element 27 that is immobile with respect to the horological movement. The second pair of parallel flexible blades 26 and the third movable element 27 being arranged in series with the second pair of parallel flexible blades 25 and the second movable element 28. The third non-movable element 27 is for example secured to a fixed plate.

Regulation means, such as a screw, may be added to exert a force 59 on the first movable element 22. By increasing the force 59, the displacement of the aneroid capsule is transmitted to a lesser degree to the first movable element 22, while by decreasing the force the displacement of the aneroid capsule is transmitted to a greater degree to the first movable element 22. The regulating means allow the sensitivity of the prestressing means 6 to be regulated as a function of pressure.

Thus, when the movable wall 13 moves away from or closer to the non-movable wall 15, the second flexible blade 21 transmits a displacement to the second movable element 28, which transmits it to the first movable element 22 via the second pair of parallel flexible blades 25. The first movable element 22 is guided by the first translation stage 33 to transmit the force or torque to the resilient element 5 through the first flexible blade 11.

In a similar manner to the first embodiment, the pressure variation will cause a variation in the volume of the aneroid capsule 15, and therefore a modification to the stiffness of the resilient element 5 and to the running of the regulating member 10.

The invention further relates to a horological movement, not shown on the figures, the movement comprising a rotary regulating member 1, 10 as described previously.

Naturally the invention is not limited to the embodiments described with reference to the figures and variants could be envisaged without departing from the scope of the invention.

The invention claimed is:

1. A regulating member for a horological movement comprising
- an oscillating weight,
- a balance spring comprising a flexible strip wound about itself in a plurality of turns, the strip having a predefined rigidity to allow the oscillating weight to undergo a rotary oscillatory motion, the strip comprising an outer end, and
- a resilient device for compensating for external pressure, connecting the outer end of the strip to a first support that is immobile with respect to the horological movement,
- wherein the resilient compensation device comprises a resilient element arranged between the outer end of the strip and the first support, as well as prestressing means for applying a variable force or torque on the resilient element according to the external pressure.

2. The regulating member according to claim 1, wherein the prestressing means comprises a spring part connected to the resilient element, the spring part transmitting the force or the torque to the resilient element.

3. The regulating member according to claim 1, wherein the prestressing means comprises an aneroid capsule a volume of which varies according to the external pressure, so as to transmit the variable force or torque according to the external pressure.

4. The regulating member according to claim 3, wherein the aneroid capsule comprises a movable wall and a non-movable wall connected by at least one spring.

5. The regulating member according to claim 2, wherein the spring part comprises a first flexible blade connected to the resilient element.

6. The regulating member according to claim 4, comprising a spring part having a translation stage connected to a first flexible blade, the aneroid capsule being in contact with the translation stage.

7. The regulating member according to claim 5, wherein the spring part comprises a first movable element connected to the first flexible blade and a second movable element, the first movable element and the second movable element being connected by a pair of parallel flexible blades.

8. The regulating member according to claim 7, wherein the spring part comprises a second flexible blade connecting the second movable element to an aneroid capsule.

9. The regulating member according to claim 1, wherein the resilient element comprises a suspended body and a pair of non-crossing blades connecting the suspended body to the first support.

10. The regulating member according to claim 9, wherein the prestressing means is connected to the suspended body so as to exert force or torque on the suspended body.

11. The regulating member according to claim 1, comprising means for regulating the prestressing means to apply the variable force on the prestressing means.

12. The regulating member according to claim 1, wherein the regulating member extends substantially in a same plane, except for the oscillating weight.

13. A horological movement comprising the regulating member according to claim 1.

14. The regulating member according to claim 1, wherein the oscillating weight includes a balance.

15. The regulating member according to claim 11, wherein the prestressing means comprises a first elongate movable element and the variable force is applied on the first elongate movable element.

16. The regulating member according to claim 9, wherein the suspended body is cylindrical.

17. The regulating member according to claim 1, wherein the prestressing means comprises a spring part connected to the resilient element and an aneroid capsule a volume of which varies according to the external pressure, the spring part transmitting the force or the torque generated by the aneroid capsule to the resilient element.

18. The regulating member according to claim 17, wherein the prestressing means comprises a movable element including a first arm and a second arm, the movable element being connected to the spring part by one end of the first arm, and the second arm being in contact with the aneroid capsule.

19. The regulating member according to claim 18, wherein the aneroid capsule comprises a movable wall and a non-movable wall connected by at least one spring, the second arm of the movable element including a rounded protrusion in contact with the movable wall of the aneroid capsule.

* * * * *